United States Patent Office 2,843,521
Patented July 15, 1958

2,843,521

PHARMACEUTICAL PREPARATIONS

Durward N. Entrekin, New Brunswick, N. J., assignor to Olin Mathieson Chemical Corporation, New York, N. Y., a corporation of Virginia No Drawing. Application May 10, 1955
Serial No. 507,500

3 Claims. (Cl. 167—56)

This invention relates to compositions of matter, more particularly to pharmaceutical preparations of magnesium hydroxide having a custard-like consistency.

Magnesium hydroxide is widely employed as an antacid and/or mild laxative. For such purpose, magnesium hydroxide is formulated either as a magma (milk of magnesia), or as a tablet. Both of these forms, however, are subject to various disadvantages. Thus, magnesia magma is an aqueous suspension which tends to separate out on standing. Furthermore, because of the low retention of magnesium hydroxide in suspension, the content of this ingredient in the suspension must be kept at a low level (usually not more than 9 percent, so that relatively large dosages are required). The viscosity and color of the magma, moreover, is such that it is unpalatable to children, and hence unpleasant to take. The tablets of magnesium hydroxide must be chewed before being swallowed and are unappetizing because of their chalky taste.

It is an object of this invention, therefore, to provide a palatable magnesium hydroxide-containing composition having a custard-like consistency.

This object is achieved by the compositions of this invention, which comprise magnesium hydroxide in a base of custard-like consistency comprising starch, glycerin, and sorbitol.

The base utilizable in the composition of this invention comprises starch, glycercin and sorbitol. These ingredients can be present in any substantial concentrations, but in order that the base or final (e. g. magnesium hydroxide-containing) composition have the consistency of custard and be relatively free from bleeding or syneresis, the starch, glycerin and sorbitol should be present in particular proportions. A preferred composition is one wherein the starch is present in a weight ratio of one part of starch to about 4–15 parts of the combined weight of glycerin and sorbitol, and the glycerin is present in a ratio of one part of glycerin to about 0.2–5 parts of sorbitol. A particularly preferred composition is one wherein the glycerin and sorbitol are present in approximately equal amounts (say in the range of 2:3 to 3:2), and the starch represents one-fifteenth to one-fifth of the total weight of the base.

To prepare the base, the starch is mixed with the sorbitol and this mixture combined with the glycerin. The three ingredients, preferably present in the ratio ranges hereinbefore defined, are then heated (desirably to a temperature of about 115–150° C.) to rupture and swell the starch and form a very stiff gummy gel, which is referred to herein as having a custard-like consistency.

If the base is to be used for an orally-administered composition, a sweetening agent, such as sodium saccharin, may be added, as well as various flavoring and coloring agents known in the art. Desirably, the base or composition thereof includes a preservative, such as methylparaben or propylparaben, in small amounts (e. g. about 0.05% to about 0.5% of the total mixture), to prevent mold formation.

To form the magnesium hydroxide-containing compositions of this invention, the base of starch, glycerin and sorbitol is mixed with a source of magnesium hydroxide. Although any source of magnesium hydroxide, such as light magnesium oxide, heavy magnesium oxide, or magnesium hydroxide itself, may be used, in order to be able to add a relatively high proportion of magnesium hydroxide without unduly stiffening the resultant mixture, water should also be added; hence, the magnesium hydroxide is preferably added as a suspension in water, such as hydromagma (a 30% suspension of magnesium oxide in water). The proportion of magnesium hydroxide to base, although not critical, should preferably be in the range of about 15% to about 60%, based on the weight of the base. The amount of water, if any, in the final composition is not critical, and depends only on the desired consistency of the final composition and the desired final concentration of the magnesium hydroxide.

The following examples illustrate the invention:

Example 1

To prepare 50 g. of a base utilizable in the composition of this invention, 4 g. of corn starch is added to 26 g. of a 70% aqueous solution of sorbitol. The mixture is stirred until evenly dispersed, whereupon 20 g. of 98% glycerin is added and the resulting mixture is stirred and heated to a temperature of 115–125° C. until a very stiff gummy gel is formed. After the gel is formed, the heating and stirring are continued for 20 to 30 minutes.

Example 2

To prepare a magnesium hydroxide-containing preparation, to 50 g. of base prepared by the procedure of Example 1 is added 50 g. of a 30% aqueous suspension of magnesium hydroxide at a temperature in the range of 115–125° C. The mixture is stirred thoroughly and allowed to cool to room temperature. If desired, 0.1 g. of sodium saccharin powder and 0.1 g. of a suitable preservative (e. g. methylparaben or propylparaben) can then be added, and the composition flavored and colored with FDA-approved flavors and colorings. A sufficient quantity of distilled water is then added to replace the water lost by evaporation and to bring the product up to a final weight of 100 g., containing about 15% by weight of magnesium hydroxide.

For distribution, this composition of Example 2 may be packed in jars, such as 2-ounce, 6-ounce or 10-ounce jars. For use as an antacid, this is administered to adults in a dosage of about one-half to about two teaspoonfuls daily and to children in a dosage of about one-fourth to about one teaspoonful daily. For use as a laxative, the dosage should be increased to about one to about two tablespoonfuls daily for an adult, about one teaspoonful for children, and one-half teaspoonful or less for infants. Because of the relatively high concentration of magnesium hydroxide in the custard-like base of this invention, these recommended dosages are approximately one-half those usually indicated for milk of magnesia.

The base utilizable in the composition of this invention can also be employed in the preparation of toothpastes, inter alia. An example of such additional formulation follows:

Example 3

To prepare a toothpaste, the following ingredients are compounded and packaged in collapsible tubes in the usual manner:

The custard base of Example 1_____percent__ 49
Chalk_____do____ 40
Sodium lauryl sulfate_____do____ 0.9
Sodium saccharin_____do____ 0.1
Hydromagma _____do____ 10
Preservatives_____ q. s.
Flavor_____ q. s.

The invention may be variously otherwise embodied within the scope of the appended claims.

I claim:

1. A pharmaceutical composition comprising magnesium hydroxide in a stiff gummy gel base, the magnesium hydroxide being present in a range of about 15% to about 60%, based on the weight of the base, and said base essentially comprising starch, glycerin and sorbitol, the glycerin and sorbitol being present in a weight ratio of one part of glycerin to about 0.2–5 parts of sorbitol.

2. The composition of claim 1 wherein the starch is present in a weight ratio of one part of starch to about 4–15 parts of the combined weight of glycerine and sorbitol.

3. A pharmaceutical composition comprising magnesium hydroxide in a stiff gummy gel base, the magnesium hydroxide being present in a range of about 15% to about 60% based on the weight of the base, and said base essentially comprising starch, glycerin and sorbitol, the glycerin and sorbitol being present in a weight ratio of about 3:2 to 2:3, and the starch being present in a weight ratio of about one-fifteenth to about one-fifth the total weight of the base.

References Cited in the file of this patent

UNITED STATES PATENTS

| | | |
|---|---|---|
| 1,817,664 | Badanes | Aug. 4, 1931 |
| 2,689,170 | King | Sept. 14, 1954 |
| 2,697,060 | Sherman | Dec. 14, 1954 |

OTHER REFERENCES

Bartilucci: J. of the Am. Pharm. Asso., vol. 43, No. 3, March 1954, pp. 159–162.

Macek: J. of the Am. Pharm. Asso., vol. 44, No. 3, April 1955, p. 254.

U. S. Dispensatory, 24th ed., 1947, pp. 1110–1111.